(12) United States Patent
An

(10) Patent No.: US 7,553,076 B2
(45) Date of Patent: Jun. 30, 2009

(54) LIGHT EMITTING APPARATUS IN TAP WATER RESPONDING TO WATER TEMPERATURE

(75) Inventor: Chi-Yup An, Gyunggi (KR)

(73) Assignees: Seung Hong Yoon, Seoul (KR); Hanil Plastic Industry Co., Ltd., Incheon (KR)

( * ) Notice: Subject to any disclaimer, the term of this patent is extended or adjusted under 35 U.S.C. 154(b) by 571 days.

(21) Appl. No.: 10/542,260

(22) PCT Filed: Dec. 15, 2003

(86) PCT No.: PCT/KR03/02747

§ 371 (c)(1),
(2), (4) Date: Aug. 10, 2005

(87) PCT Pub. No.: WO2004/092626

PCT Pub. Date: Oct. 28, 2004

(65) Prior Publication Data

US 2006/0118645 A1 Jun. 8, 2006

(30) Foreign Application Priority Data

Jan. 16, 2003 (KR) .................. 10-2003-0002853
Mar. 4, 2003 (KR) .................. 10-2003-0013299

(51) Int. Cl.
*G01K 13/02* (2006.01)
(52) U.S. Cl. ........................................ 374/148
(58) Field of Classification Search ............. 374/147, 374/148
See application file for complete search history.

(56) References Cited

U.S. PATENT DOCUMENTS

| 4,241,868 A | | 12/1980 | Perkins | |
| 4,630,940 A | * | 12/1986 | Ostertag et al. | ............. 374/148 |
| 4,743,120 A | * | 5/1988 | Bowen | ........................ 374/147 |
| 4,936,508 A | * | 6/1990 | Ingalz | ........................... 239/72 |
| 5,171,429 A | * | 12/1992 | Yasuo | ........................... 210/94 |
| 5,349,985 A | | 9/1994 | Fischer | |
| 5,372,048 A | * | 12/1994 | Dunbar | ..................... 73/861.91 |

(Continued)

FOREIGN PATENT DOCUMENTS

EP 446365 A 9/1991

(Continued)

OTHER PUBLICATIONS

Abstract of Publication of JP-02-286987.

*Primary Examiner*—Gail Verbitsky
(74) *Attorney, Agent, or Firm*—Oppedahl Patent Law Firm LLC; Carl Oppedahl; Terrence M. Wyles

(57) ABSTRACT

Disclosed is a tap water temperature sensing type of light emitting apparatus, including: a power source 15 adapted to supply power; a control unit 30 for sensing opening/closing state of the tap tube to control the power source 15 such that if the tap tube is opened, power supply is done and if the tap tube is closed, the power supply is stopped; a sensing unit 40 disposed around a portion where hot water and cool water meet for sensing the temperature of water in the tap tube; and a light emitting unit 50 for producing different color lights in accordance with the water temperature read in the sensing unit 40.

9 Claims, 8 Drawing Sheets

U.S. PATENT DOCUMENTS

| | | | |
|---|---|---|---|
| 5,491,617 A | | 2/1996 | Currie |
| 5,915,415 A | * | 6/1999 | Huang ................. 137/551 |
| 6,641,305 B2 | * | 11/2003 | Wang ................. 374/148 |
| 7,000,850 B2 | * | 2/2006 | Lin ................. 236/94 |
| 7,246,941 B2 | * | 7/2007 | Shike ................. 374/148 |
| 2002/0097777 A1 | * | 7/2002 | Ronci ................. 374/157 |
| 2002/0129663 A1 | * | 9/2002 | Hoyt et al. ................. 73/861.79 |
| 2008/0251533 A1 | * | 10/2008 | Giles et al. ................. 222/14 |
| 2008/0295897 A1 | * | 12/2008 | Vincent ................. 137/488 |

FOREIGN PATENT DOCUMENTS

| | | | |
|---|---|---|---|
| JP | 02286987 A | | 11/1990 |
| JP | 04343927 A | | 4/1993 |
| JP | 62261829 A | | 4/1998 |
| JP | 20000024110 | | 6/2000 |
| JP | 2002266394 A | | 1/2003 |
| KR | 2003013498 A | * | 2/2003 |

* cited by examiner

US 7,553,076 B2

LIGHT EMITTING APPARATUS IN TAP WATER RESPONDING TO WATER TEMPERATURE

This application is a 371 National Phase of International Application Ser. No. PCT/KR2003/002747, published in English on Oct. 28, 2004 as WO 2004/092626 A1.

TECHNICAL FIELD

The present invention relates to a light emitting apparatus in a tap water responding to or sensing water temperature. More particularly this invention relates to a tap water temperature sensing type of light emitting apparatus that is adapted to emit different color lights according to the variations of water temperature in use of tap water, thereby not only enabling users to visibly check the instant water temperature but also allowing users to be cope with a sudden change in the water temperature.

BACKGROUND ART

Many kinds of taps that are used recently are adapted to control the water temperature according to the manipulation of an operation lever by users. However, they cannot provide the users with instant water temperature such that when the operation lever is moved by their involuntary action, very hot water may come out from the tap, hence increasing the danger to them.

Therefore, there is a need for the development of tap transforming system where different color lights are generated in accordance with the variations of the water temperature (for example, when the temperature is hot, it is red, when it is warm, it is purple, and when it is cool, it is blue), thereby improving a current way of producing water, without having any color, thus to provide a user with attractiveness of use while the water is used.

DISCLOSURE OF INVENTION

Accordingly, the present invention has been made to solve the above-described problems, and it is an object of the present invention to provide a tap water temperature sensing type of light emitting apparatus that is provided with a light emitting elements that produces different color lights in accordance with the variations of the water temperature, thereby not only allowing users to visibly check instant water temperature from the tap but also satisfying a variety of desires of the users generally.

It is another object of the present invention to provide a tap water temperature sensing type of light emitting apparatus that generates electricity in itself by use of the water coming out in a tap tube such that it does not need a separate power source.

It is still another object of the present invention to provide a tap water temperature sensing type of light emitting apparatus that is adapted to emit different color lights in accordance with the variations of the water temperature, using an electric resistance value that is varied by the instant water temperature.

According to this object of the present invention, there is provided a tap water temperature sensing type of light emitting apparatus including: a power source adapted to supply power; a control unit for sensing opening/closing state of the tap tube to control the power source such that if the tap tube is opened, power supply is done and if the tap tube is closed, the power supply is stopped; a sensing unit disposed around a portion where hot water and cool water meet for sensing the temperature of water in the tap tube; and a light emitting unit for producing different color lights in accordance with the water temperature read in the sensing unit.

The power source is provided with a generator that has a magnetic turbine disposed at a tap end portion where water comes out and a coil fixed around the magnetic turbine with a result that the magnetic turbine is rotated as the water drops from the tap end portion, thereby generating alternating current and with a rectifier that is adapted to transform the alternating current generating from the generator to direct current. Therefore, the light emitting apparatus can generate power in itself, without having any additional driving source.

The control unit is provided with a spring that is adapted to be fixed to the tap tube at one end thereof, a magnetic valve that is disposed at the other end of the spring, and a reed relay that is mounted on an outer surface of the tap tube in such a manner as to be turned on and off to control the power source when the water flows through the tap tube and when there is no water running therethrough to thereby move the magnetic valve forwardly and backwardly.

The sensing unit is adapted to measure the water temperature by use of the water to be measured as a direct heat medium, unlike an alloy thermocouple, a thermister, or a hydraulic limit switch that is used in the conventional practices, and to emit the different color lights in accordance with the measured information.

BRIEF DESCRIPTION OF DRAWINGS

Further objects and advantages of the invention can be more fully understood from the following detailed description taken in conjunction with the accompanying drawings, in which:

FIG. 4b shows a sectional view taken along the line A-A of FIG. 4a;

BEST MODE FOR CARRYING OUT THE INVENTION

Figure 1:
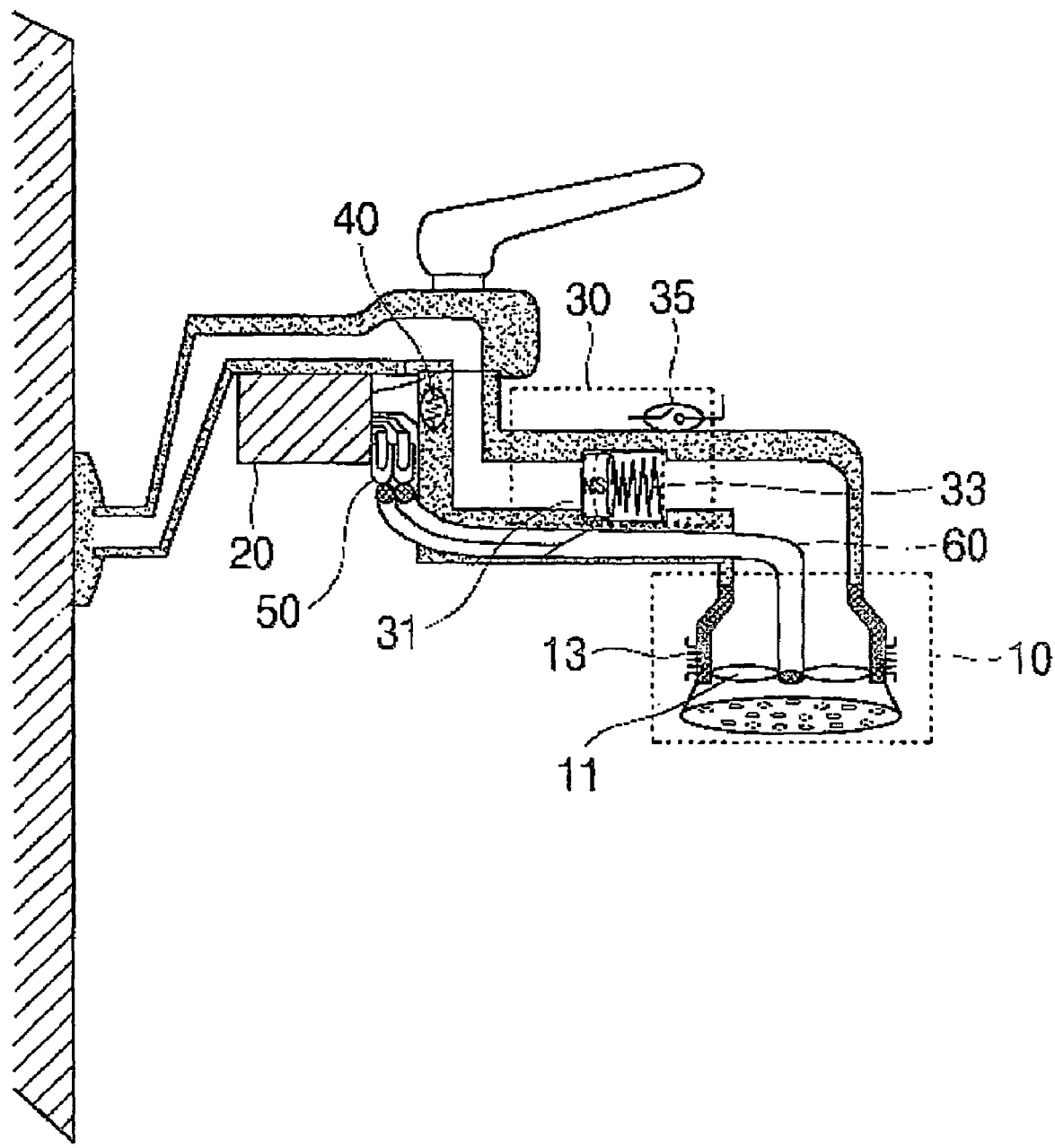
FIG. 1 shows a view of the present invention.
Figure 2:
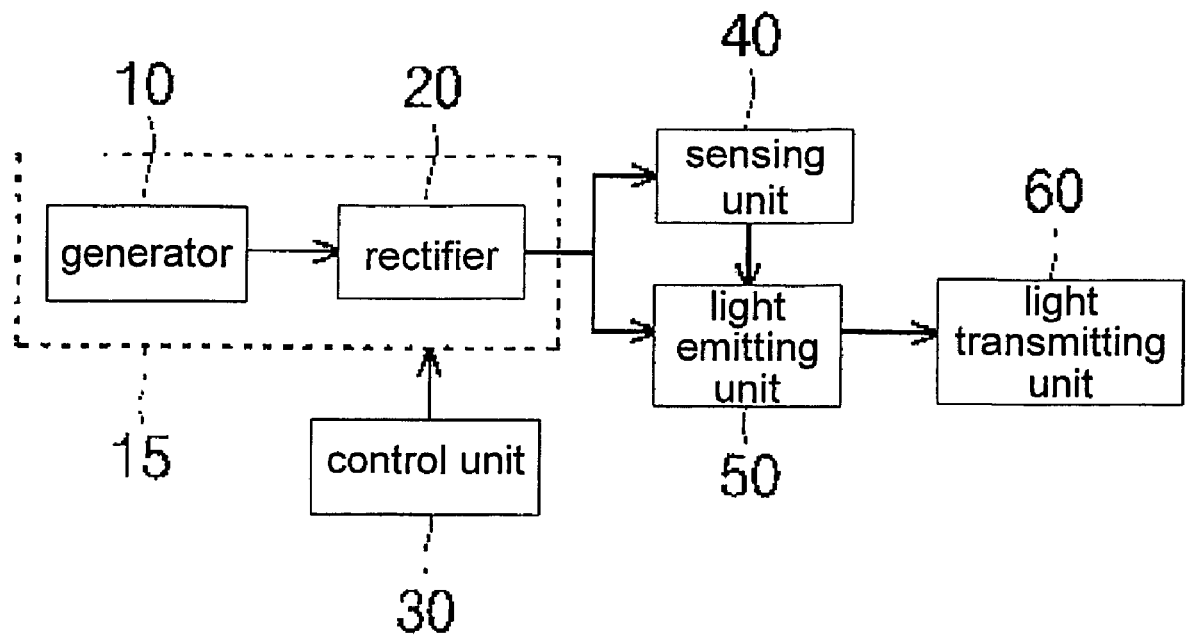
FIG. 2 shows a block diagram of the units of the present invention.

Now, an explanation of the preferred embodiment of the present invention will be in detail given with reference to attached drawings. FIGS. 1 to 6 show the construction of each part of the present invention.

Referring to FIGS. 1 to 3a, the present invention includes a power source 15 that is provided with a generator 10 that has a small size of magnetic turbine rotated by the pressure of discharge of tap water to thereby generate alternating current and with a rectifier 20 that transforms the alternating current generated in the generator 10 to direct current to thereby provide the direct current to each part, a control unit 30 that is adapted to sense whether the tap tube is opened and closed to thereby control the power supply of the power source 15, a sensing unit 40 that is disposed around a portion where cool water and hot water meet to thereby sense the temperature of water in the tap tube, a light emitting unit 50 that is adapted to produce different color lights in accordance with the sensed water temperature in the sensing unit 40, and a light transmitting unit 60 that is adapted to receive the light produced from the light emitting unit 50, for transmitting the light to a discharge outlet of the tap tube. Hereinafter, an explanation of the construction and operation of each part of the present invention is given.

Figure 4A:
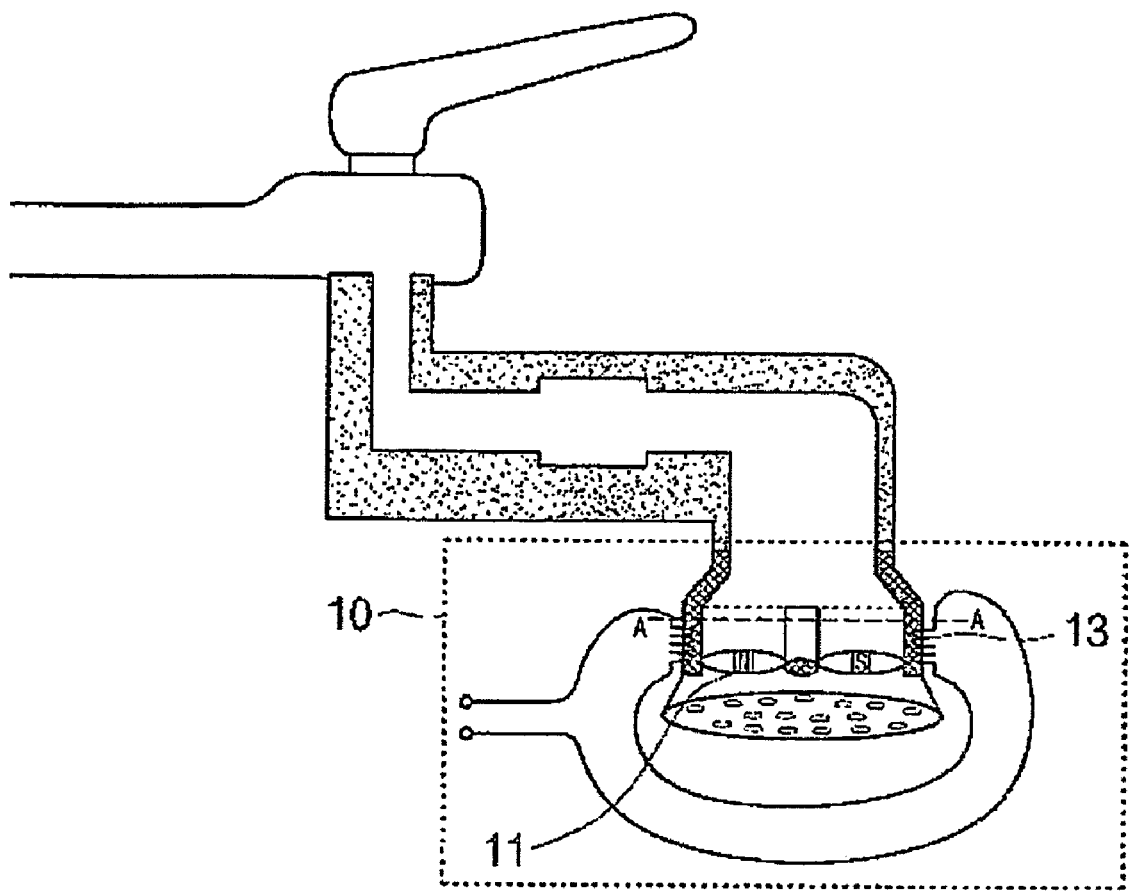
FIG. 4a shows a view of the generator of the present invention.
Figure 4B:
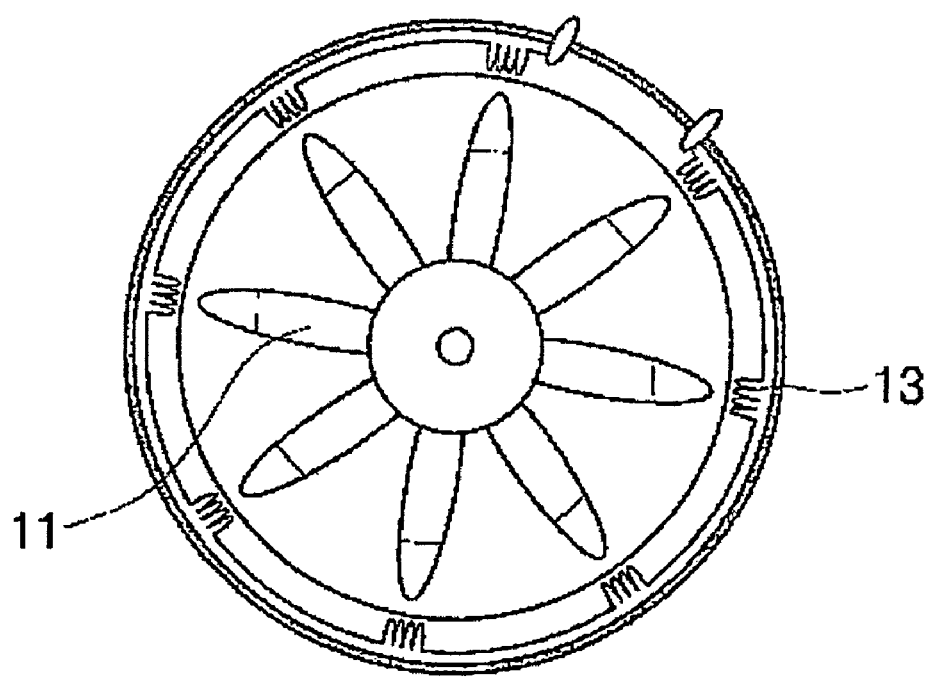

Referring to the power source 15, first of all, it includes the generator 10 and the rectifier 20. The generator 10 operates under the Faraday's law, which is similar to the principle of a hydroelectric generator. The Faraday's law is the principle where the magnetic flux in a coil is varied thus to generate electricity from the coil. In the embodiment of the present invention, as shown in FIG. 4a, the small size of magnetic turbine 11 is positioned at the discharge outlet through which tap water comes out and a coil 13 is fixedly placed around the magnetic turbine 11. Thereby, the magnetic turbine 11 is rotated by the action of the discharge pressure of the tap water with a result of generating electricity in the coil 13. At that time, the electricity that has been generated in the coil 13 is alternating current AC that is varied in size and direction as time passes by. FIG. 4b is a sectional view taken along the line A-A of FIG. 4a. The principle where the magnetic turbine 11 is rotated is similar to that where a vane is turned with the wind. In this case, when the magnetic turbine 11 is disposed in such a manner as to be slightly oblique with respect to a horizontal axis, it is rotated by the pressure of the discharge water.

The present invention provides a power system that can be used for almost semi-permanent period of time as it generates electricity by use of tap water, hence solving the inconveniences that leakage of electricity may be caused when commercial power for homes is used and when batteries are used, they should be replaced after the consumption. This is very practical and innovative.

The rectifier 20 serves to transform the alternating current generated in the generator 10 into the direct current DC and to store therein, thus to supply the DC to each part. The rectifier 20 may be made by the combination of rechargeable circuit including a rectifying circuit and a condenser, and as the construction is well known, it may be modified freely by the selection of the ordinary person in the art. In the present invention, the generator 10 is the system that generates electricity in itself by use of the pressure of discharge of tap water, but it is obvious that the commercial power for homes or the DC batteries as used in existing ways have the same effects as the generator of the present invention.

Figure 5A:
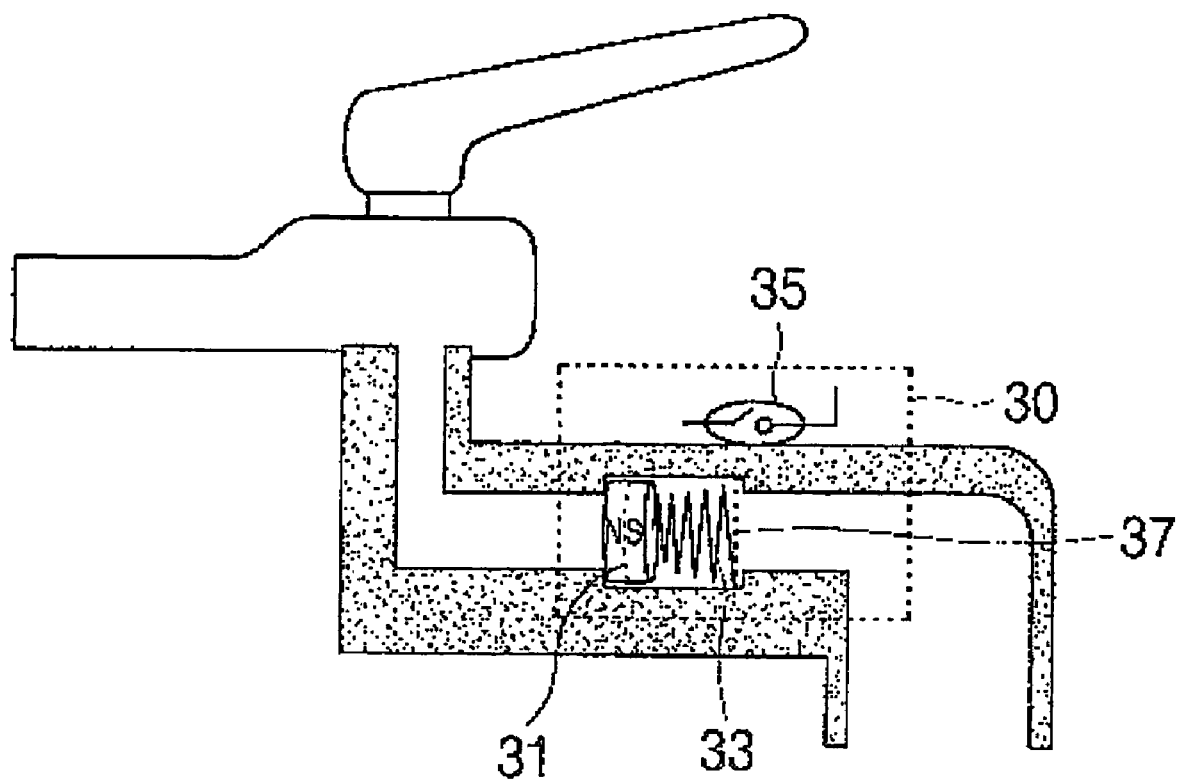
FIG. 5a shows a view of the control unit of the present invention.

Referring next to the control unit 30, it serves to control the power source 15 in accordance with the opening/closing of the tap tube, and as shown in FIG. 5a, includes a magnetic valve 31, a spring 33 and a reed relay 35. The spring 33 is disposed inside the tap tube and preferably is made of a material that does not form any rust such as stainless steel, non-metals, or the like.

The spring 33 of the control unit 30 is fixed to the tap tube at one end thereof, and the magnetic valve 31 is disposed at the other end of the spring 33. The reed relay 35 is mounted on the outer surface of the tap tube and is turned on and off when the water flows through the tap tube and when there is no water running therethrough to thereby move the magnetic valve 31 forwardly and backwardly, thereby allowing the power source 15 to be controlled. In other words, when the tap tube is opened to flow the water therethrough, the magnetic valve 31 applies a force caused by the pressure of water to the spring 33, thus to move forwardly, while compressing the spring 33 such that the reed relay 35 outside the tap tube is turned on, hence permitting the power source 15 being in connection with the reed relay 35 to supply the power. Contrarily, when the tap tube is closed to stop the supply of water, the magnetic valve 31 moves back to its original position such that the reed relay 35 is turned off, hence keeping the power source 15 from supplying the power.

Figure 5B:
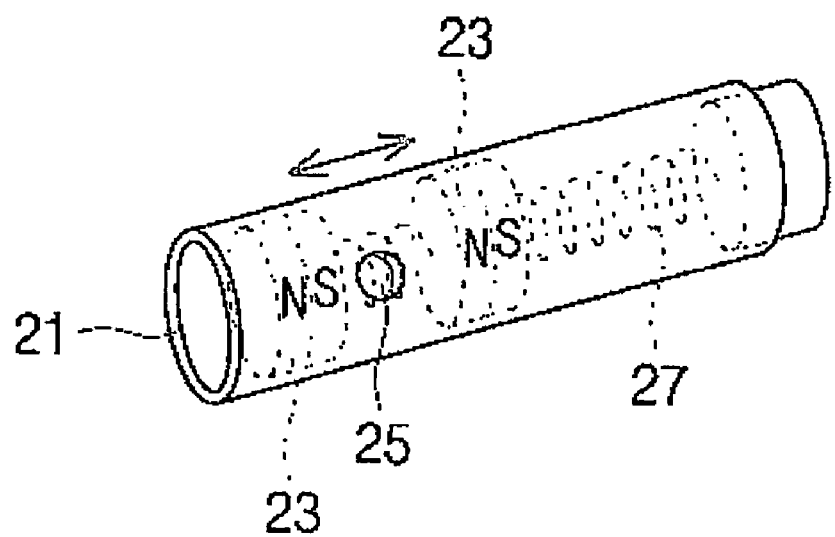
FIG. 5b shows a view of another example of the control unit of the present invention.
Figure 6:
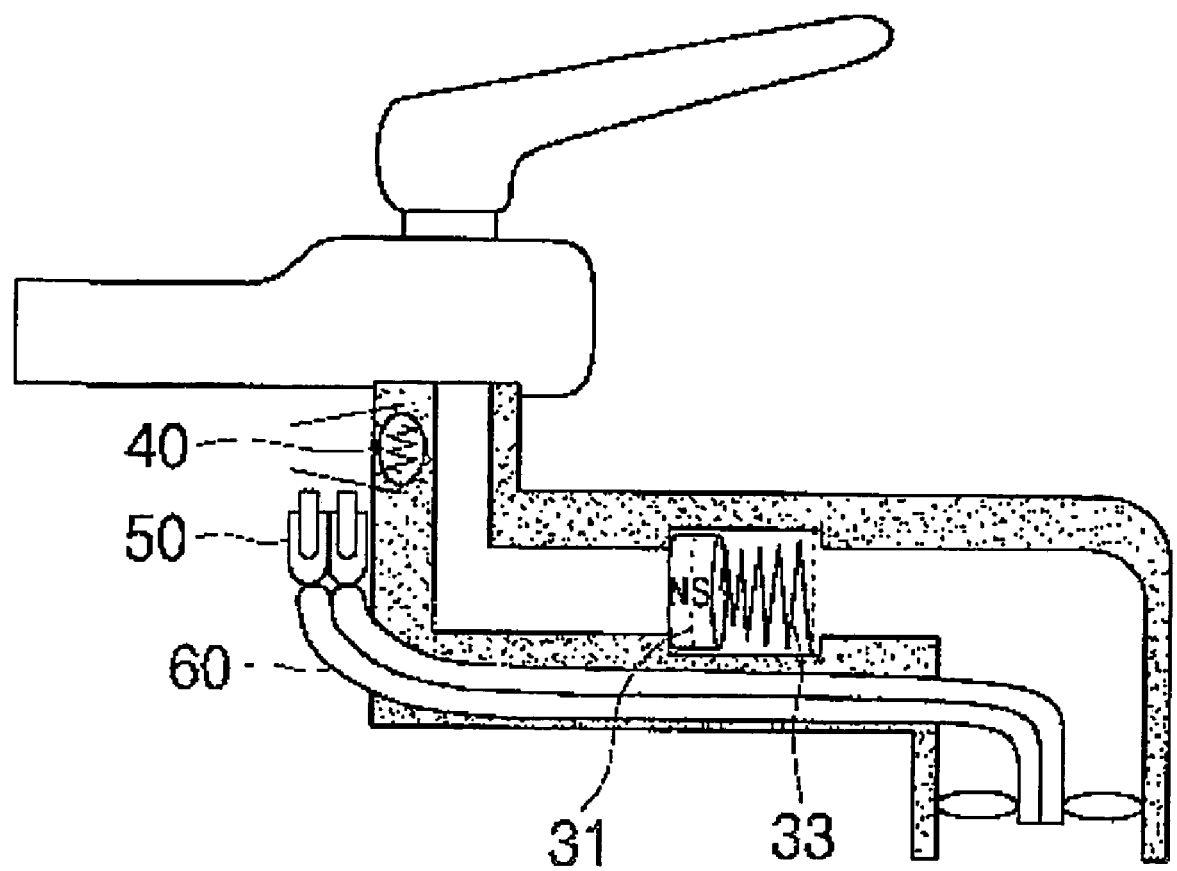
FIG. 6 shows a view of the light emitting unit and the light transmitting unit of the present invention.

FIG. 5b shows another example of the control unit 30 of the present invention. The control unit 30 is formed in such a manner that a hollow tube 21 has a hole 25 formed on the both sides thereof, respectively, a spring 27 fixed at one end thereof in the hollow tube 21, and a permanent magnet 23 fixed at the free end of the spring 27. The operation is carried out in a similar way to that in FIG. 5a, and in this manner, in the state where the tap tube is not opened the water pressure is not produced and thus, the spring 27 is not compressed with a result that the permanent magnet 23 is placed at the front of the hollow tube 21, which makes the reed relay turned off. Contrarily, in the state where the tap tube is opened the water pressure is produced and thus, the spring 27 is compressed with a result that the permanent magnet 23 moves below the holes 25, which makes the reed relay turned on. Thereby, the power source 15 starts to supply the power. At that time, the tap water flows in the tab tube through the holes 25.

Referring now to the sensing unit 40 and the light emitting unit 50, the sensing unit 40 serves to sense the water temperature, which is placed around a portion where cool water and hot water meet. Of course, the sensing unit 40 may be placed at every portion where the water temperature is measured.

The light emitting unit 50 serves to receive the power by the power source 15 and to emit different color lights, depending upon the sensed water temperature in the sensing unit 40. In the present invention, the light emitting unit 50 is employed with two tones of color LED. Of course, it may be not limited thereto. In case of the two tones of color LED, when water temperature is high, it displays red, when low, it displays blue, and when at a room temperature, it displays purplish red or purple. However, it can be replaced in colors like yellow, green, greenish yellow, and the like according to the preference of a user. In this manner of using mixed colors, a digital three color way or an analog way of two primary colors may be adopted.

In the present invention, the light emitting unit 50 includes two LEDs 51 and 53 emitting different color lights from each other and a low temperature driver 55 and a high temperature driver 57 driving the two LEDs 51 and 53. If the water temperature sensed in the sensing unit 40 is less than a predetermined temperature T1, the low temperature driver 55 operates such that the LED 53 connected to the low temperature driver 55 emits its own color light. To the contrary, if the water temperature sensed in the sensing unit 40 is more than a predetermined temperature T2, the high temperature driver 57 operates such that the LED 51 emits its own color light. However, if the water temperature is between the T1 and T2, the low temperature driver 55 and the high temperature driver 57 are all activated such that the two LEDs 51 and 53 all emit their color lights. Thus, the light emitting unit 50 can emit the three color lights in accordance with the water temperature.

Figure 3A:
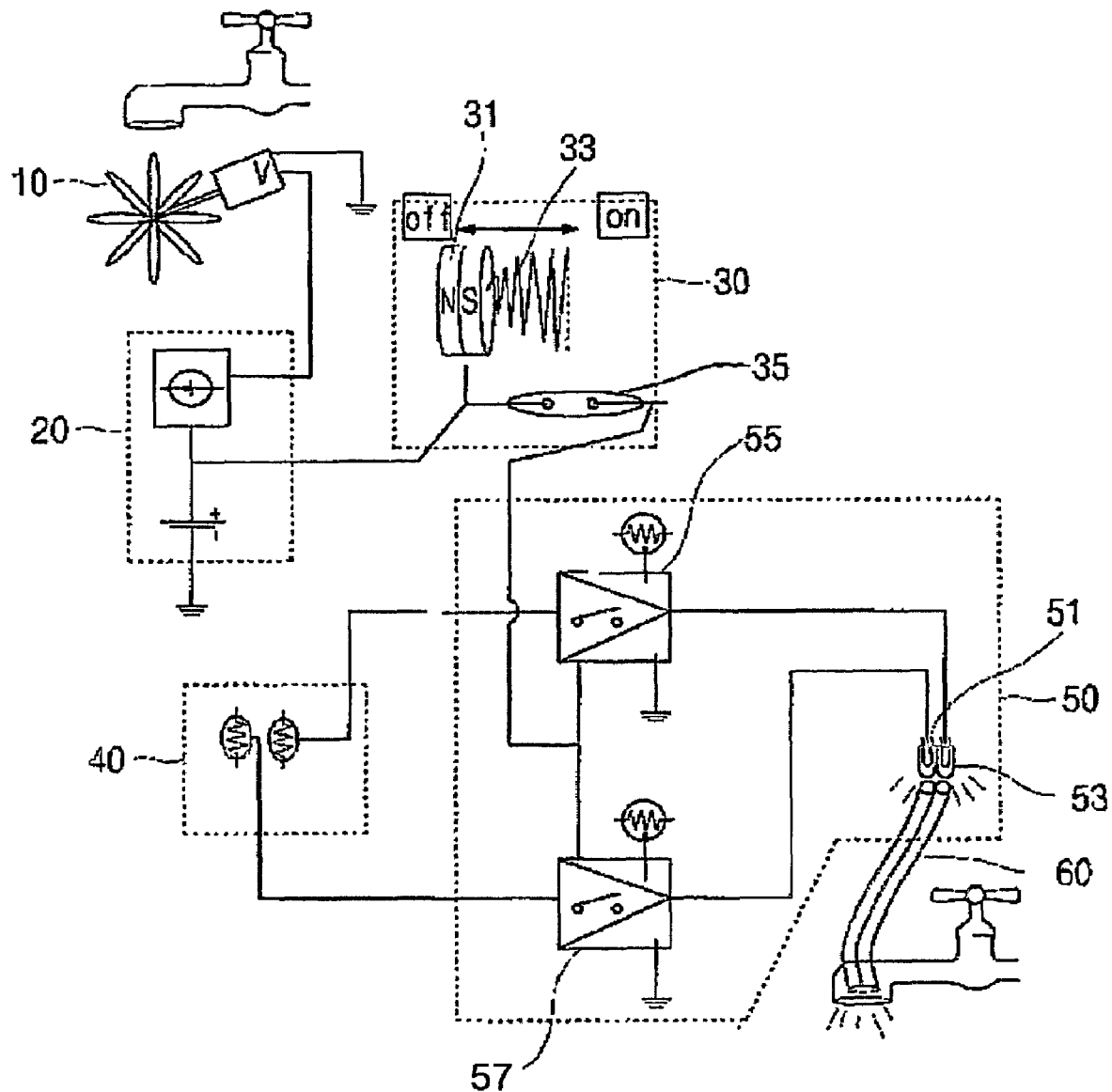
FIG. 3a shows a view of the circuit construction of each unit of the present invention.
Figure 3B:
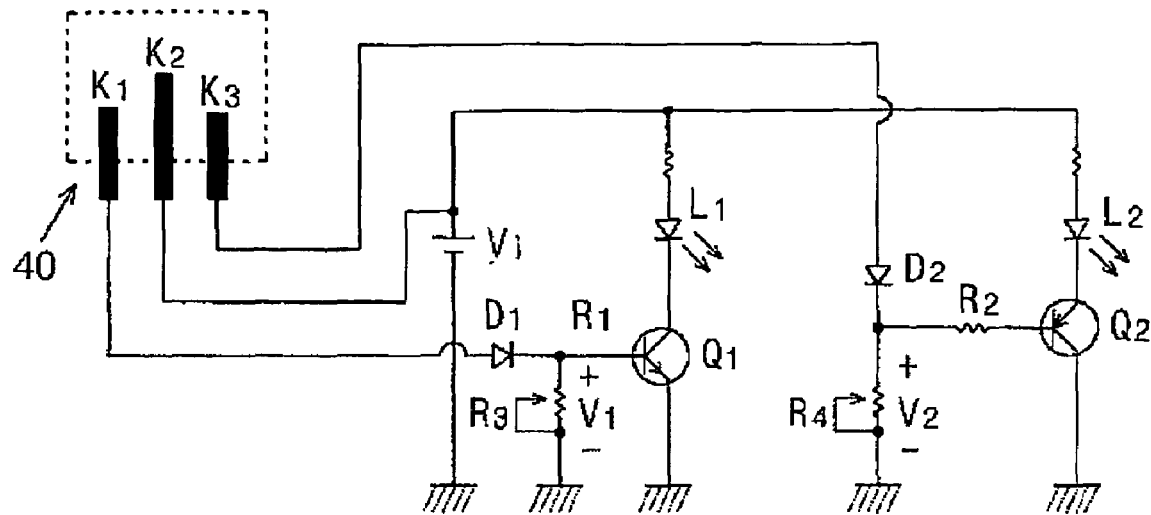
FIG. 3b shows a view of the example of the sensing unit and the light emitting unit of the present invention.

FIG. 3b shows the details of the sensing unit 40, the high temperature driver 57, the low temperature driver 55 and the light emitting unit 50. As shown, the sensing unit 40 includes a common electrode k2 disposed in the middle portion thereof, a first electrode k1 disposed at the left side of the common electrode k2, and a second electrode k3 disposed at the right side of the common electrode k3. The three electrodes are disposed in such a manner as to be partially submerged into the tap water. Preferably, as shown in FIG. 3b, the common electrode k2 has a higher submersion height than the first and second electrodes k1 and k3. In other words, the common electrode k2 has a deeper submersion depth than the first and second electrodes k1 and k3, hence preventing the electrical disturbance between the first and second electrodes k1 and k3 from being caused therein. The electrodes of the sensing unit 40 are formed of carbon or stainless steel that prevents the generation of oxidization and electrolytic corrosion, but in case of a consumable sensor, it may be formed of nonferrous metals.

The sensing unit 40 is positioned around the portion where hot water and cool water are blended. The portion of the common electrode k2 that is not submerged in the water is connected to power, and the portions of the first and second electrodes k1 and k3 that are not submerged in the water are connected to the high temperature driver 57 and the lower temperature driver 55. The high temperature driver 57 includes a diode D1, a resistance R1, a variable resistance R3, and an npn transistor Q1, and the low temperature driver 55 includes a diode D2, a resistance R2, a variable resistance R4 and a pnp transistor Q2. A high temperature emitting diode L1 is connected between a collector of the npn transistor Q1 of the high temperature driver 57 and a common terminal, and a low temperature emitting diode L2 is connected between an emitter of the pnp transistor Q2 of the low temperature driver 55 and the common terminal.

Figure 3C:
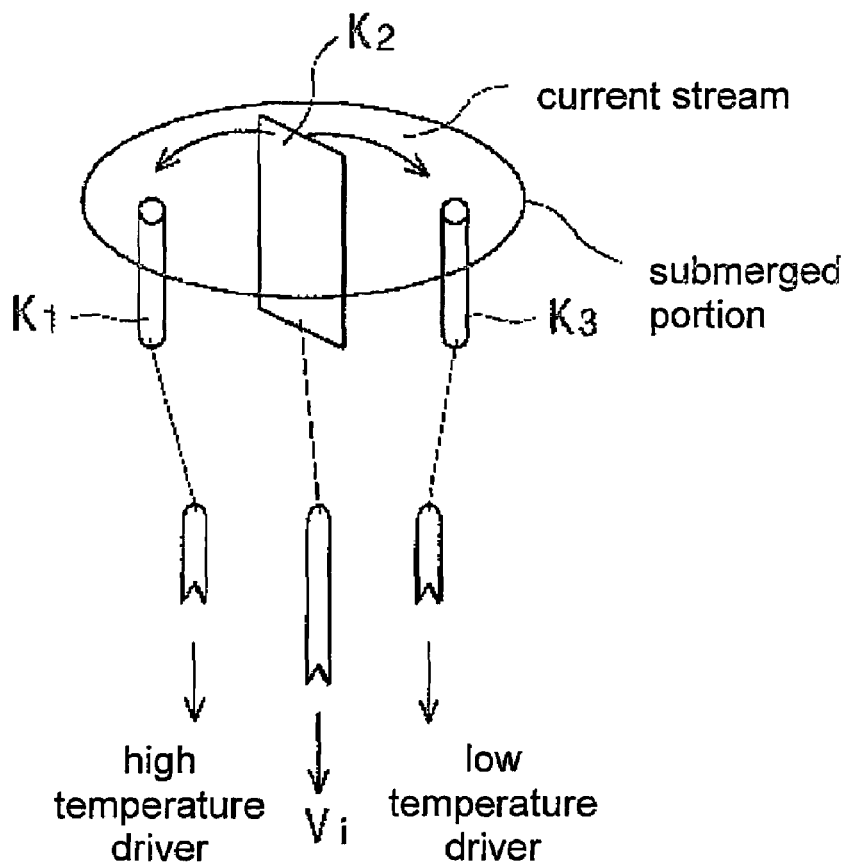
FIG. 3c shows a view used to describe the principles of the sensing unit of the present invention.

An explanation of the operations of the sensing unit 40 and the light emitting unit 50 will be given. The present invention makes use of the principle that the electrical resistance of water is varied in accordance with the water temperature, that is, it is low at a high temperature and it is high at a low temperature. FIG. 3c shows the principle of the sensing unit 40 of the present invention. If the water into which the electrodes k2, k1 and k3 are submerged partially is at the high temperature, the electrical resistance becomes low such that the current from the power flows easily into the first and second electrodes k1 and k3 through the common electrode k2. The current flowing through the first electrode k1 is transmitted via the diode D1 and the resistance R1 to thereby activate the transistor Q1 such that the light emitting diode L1 is activated to emit the light, whereas the current flowing through the second electrode k3 is transmitted via the diode D2 and the resistance R2 to the base of the transistor Q2. In this case, since the transistor Q2 is the pnp transistor, it is not activated such that the light emitting diode L2 does not emit any light. To the contrary, if the water is at the low temperature, the operation opposite to that mentioned above is carried out such that the high temperature light emitting diode L1 does not emit any light, whereas the low temperature light emitting diode L2 emits the light. With the control of the variable resistances R3 and R4, the base input voltages (V1 and V2) of the transistors Q1 and Q2 are controlled such that emitting the light is conducted at desired temperatures. If the water is within a predetermined temperature, the diodes L1 and L3 are all operated. In this case, the high temperature light emitting diode L1 emits the red light and the low temperature light emitting diode L2 emits the blue light, which enables the users to recognize the water temperature with ease.

The construction of the light emitting unit 50 as mentioned above is just one example, and therefore, it may be constructed to emit three or more different color lights according to the intention of the designer.

Referring finally to the light transmitting unit 60, it serves to transmit the light from the light emitting unit 50 to the discharge outlet of the tap water, thereby changing the color of water flowing from the discharge outlet. In the present invention, the light emitting unit 50 is mounted outside the tap tube for the purpose of preventing the damage caused due to the contact with hot water, and the light emitted from the light emitting unit 50 is transmitted through the light transmitting unit 60 (which is composed of optical fibers in the present invention) in the tap water. However, the light transmitting unit 60 is not limited thereto. On the other hand, if the light emitting unit 50 is extended up to the discharge outlet of the tap water, the present invention does not need the light transmitting unit 60.

Figure 7:
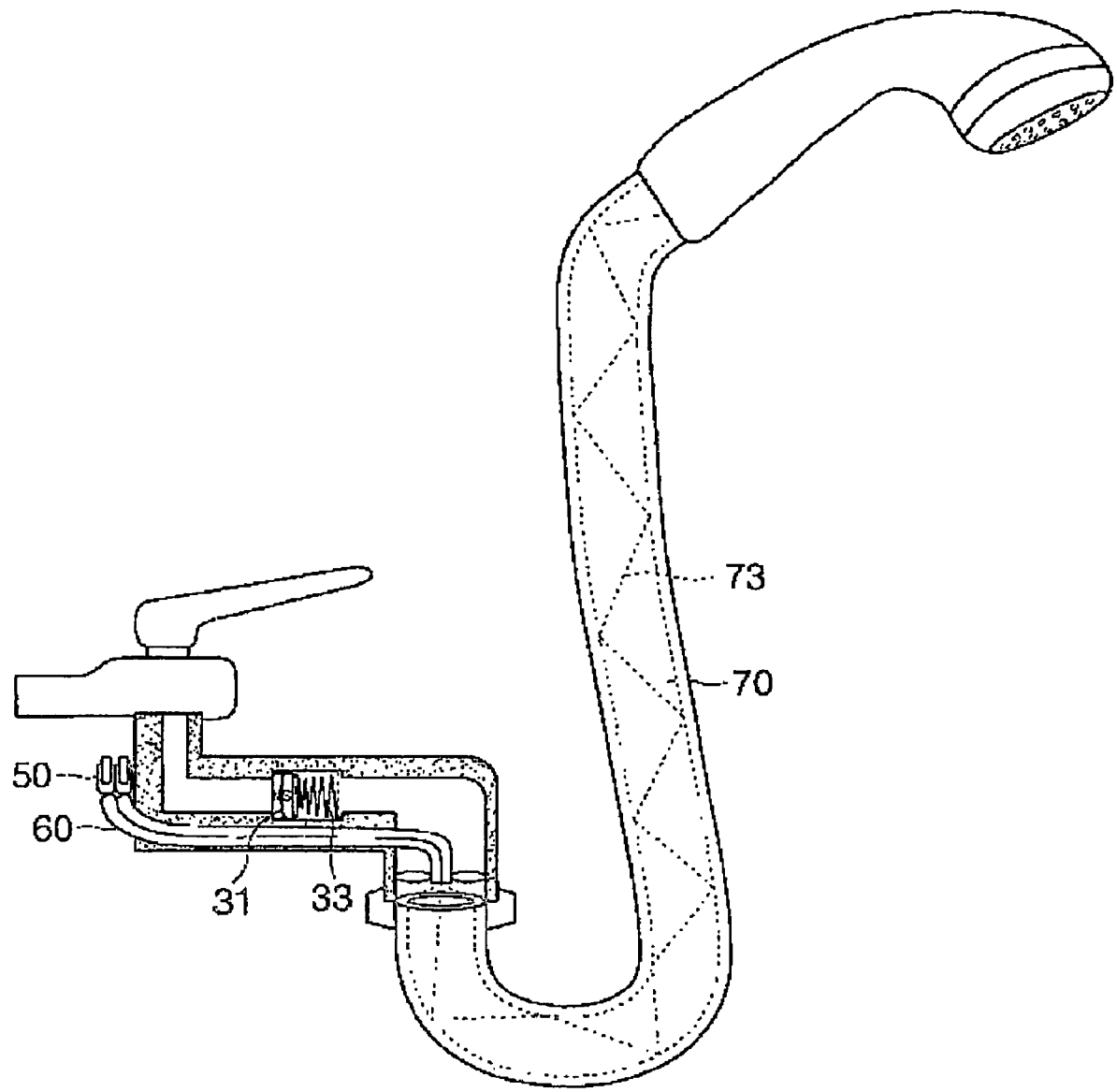
FIG. 7 shows a view of another application of the present invention.

FIG. 7 shows another application of the present invention, where a shower hose 70 is connected to the discharge outlet of the tap water. The shower hose 70 is made of transparent or semi-transparent material and has high reflection on an outer surface and low reflection on an inner surface.

As shown, the light transmitted through the light transmitting unit 60 is sent to the shower hose 70 that has the different reflection on the outer and inner surfaces such that the light causes total internal reflection that allows the whole of shower hose 70 to emit fantastic color lights according to the water temperature. This system is applicable to kitchens, bathrooms, public baths, etc., which helps the number of new demands for this product substantially increase.

INDUSTRIAL APPLICABILITY

As set forth in the foregoing, there is provided a tap water temperature sensing type of light emitting apparatus that emits different color lights during the use of the tap water to allow users to visibly check the instant water temperature, hence decreasing the danger to the users, and transmits the light from the light emitting unit to the tap water or the transparent or semi-transparent shower hose by using the coherent feature of water, hence providing users with a pleasant tap device that satisfies the preferences of modern people.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The invention claimed is:

1. A tap water temperature sensing type of light emitting apparatus, comprising:
   a power source (15) having a generator (10) having a magnetic turbine (11) disposed at a tap end portion, where water comes out and a coil (13) fixed around the magnetic turbine (11) with a result that the magnetic turbine (11) is rotated as the water drops from the tap end portion, thereby generating alternating current,
   and a rectifier (20) adapted to transform the alternating current generating from the generator (10) to direct current;
   a control unit (30) for sensing opening/closing state of the tap tube to control the power source (15) such that if the tap tube is opened, the power source (15) is enabled and if the tap tube is closed, the power source (15) is stopped;
   a sensing unit (40), powered by the power source (15), disposed around a portion where hot water and cool water meet for sensing the temperature of water in a tap tube; and a light emitting unit (50) powered by the power source (15), which includes at least two light emitting diodes, for producing different color lights in accordance with the water temperature read in the sensing unit (40); and wherein:

said sensing unit (40) comprises:

a common electrode (k2) extended to a portion where hot water and cool water meet in the tap tube at one end thereof and connected to power at the other end thereof, and first and second electrodes (k1 and k3) placed at left and right sides of the common electrode (k2) in such a manner as to be submerged partially in the tap water; and the light emitting unit (50) comprises:

a high temperature driver (57) connected to an end of the first electrode (k1) that is not submerged in the tap water, a low temperature driver (55) connected to an end of the second electrode (k3) that is not submerged in the tap water, a high temperature light emitting element connected to the high temperature driver (57) for emitting a light when the tap water is more than a predetermined temperature (T2), and a low temperature light emitting element connected to the low temperature driver (55) for emitting a light when the tap water is less than a predetermined temperature (T1).

2. A tap water temperature sensing type of light emitting apparatus according to claim 1, wherein the light emitting unit (50) is mounted around a discharge outlet of tap water, the light emitting unit (50) being sealed with a transparent or semi-transparent material.

3. A tap water temperature sensing type of light emitting apparatus according to claim 1, wherein the light emitting unit (50) further comprises a light transmitting unit (60) that is made of optical fibers for transmitting the light emitted from the light emitting unit (50) to the inside of the discharge outlet of the tap water.

4. A tap water temperature sensing type of light emitting apparatus according to claim 1, wherein the control unit (30) comprises:

a spring (33) adapted to be fixed to the tap tube at one end thereof;

a magnetic valve (31) disposed at the other end of the spring (33); and a reed relay (35) mounted on an outer surface of the tap tube in such a manner as to be turned on and off to control the power source (15) when the water flows through the tap tube and when there is no water running therethrough to thereby move the magnetic valve (31) forwardly and backwardly.

5. A tap water temperature sensing type of light emitting apparatus according to claim 1, wherein the light emitting unit (50) comprises two or more light emitting elements that generate different color lights from each other.

6. A tap water temperature sensing type of light emitting apparatus according to claim 2, wherein the discharge outlet of the tap water is connected to a shower hose (70) that is made of transparent or semi-transparent material and has high reflection on an outer surface thereof and low reflection on an inner surface thereof.

7. A tap water temperature sensing type of light emitting apparatus according to claim 1, wherein:

the high temperature driver (57) comprises an npn transistor (Q1) and a variable resistance (R3) connected to a base of the npn transistor (Q1) for controlling the voltage of the base of the npn transistor (Q1);

the low temperature driver (55) comprises a pnp transistor (Q2) and a variable resistance (R4) connected to a base of the pnp transistor (Q2) for controlling the voltage of the base of the pnp transistor (Q2);

the high temperature emitting element is a light emitting diode (L1) connected to a collector of the npn transistor (Q1) of the high temperature driver (57); and the low temperature emitting element is a light emitting diode (L2) connected to an emitter of the pnp transistor (Q2) of the low temperature driver (55), the light emitting diode (L2) emitting the different color light from the light emitting diode (L1).

8. A tap water temperature sensing type of light emitting apparatus according to claim 1, wherein the common electrode (k2) has a higher submersion height than the first and second electrodes (k1 and k3).

9. A tap water temperature sensing type of light emitting apparatus according to claim 1, wherein the common electrode (k2), the first electrode (k1), and the second electrode (k3) of the sensing unit (40) are formed of carbon or stainless steel.

\* \* \* \* \*